Figure 1:
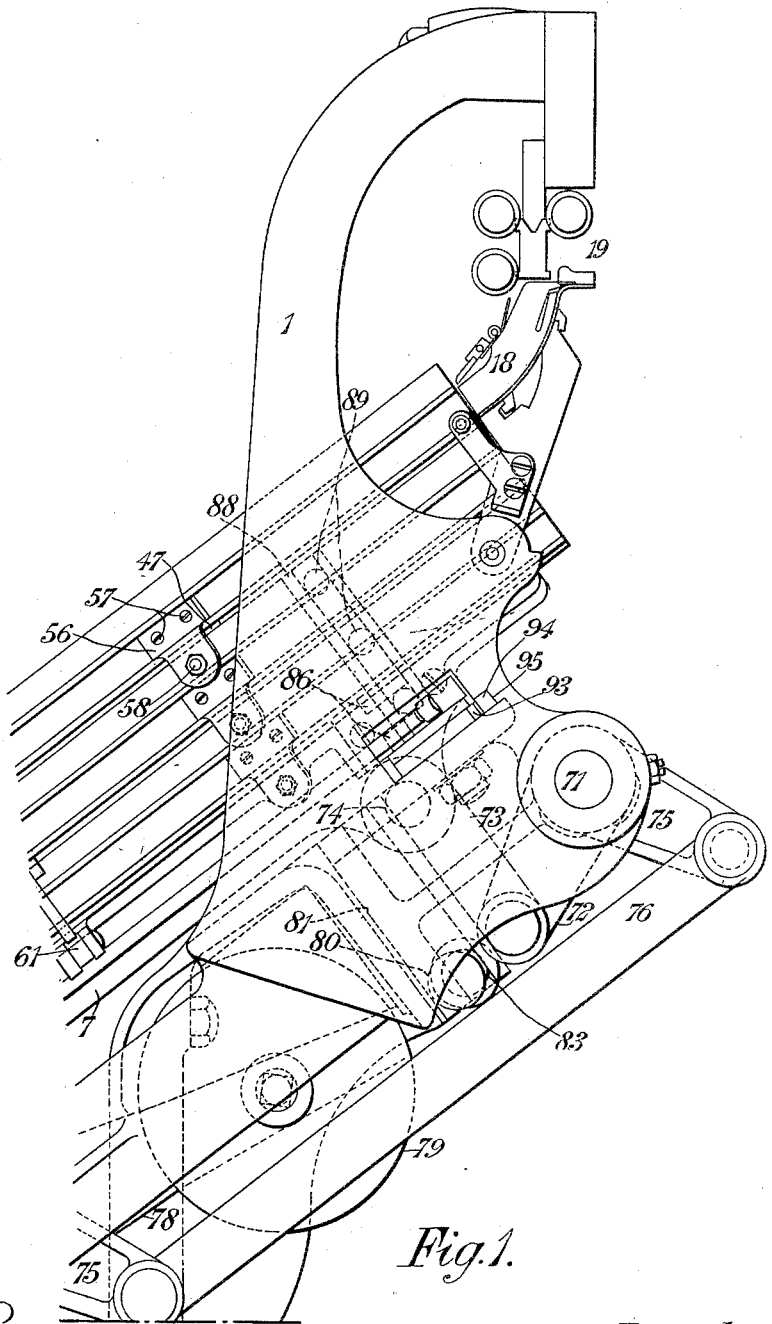

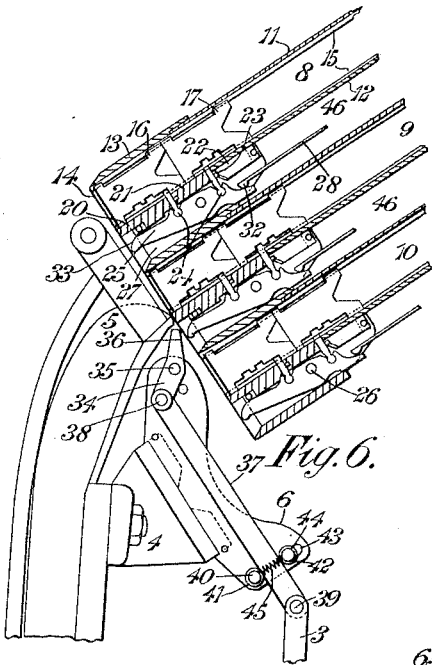

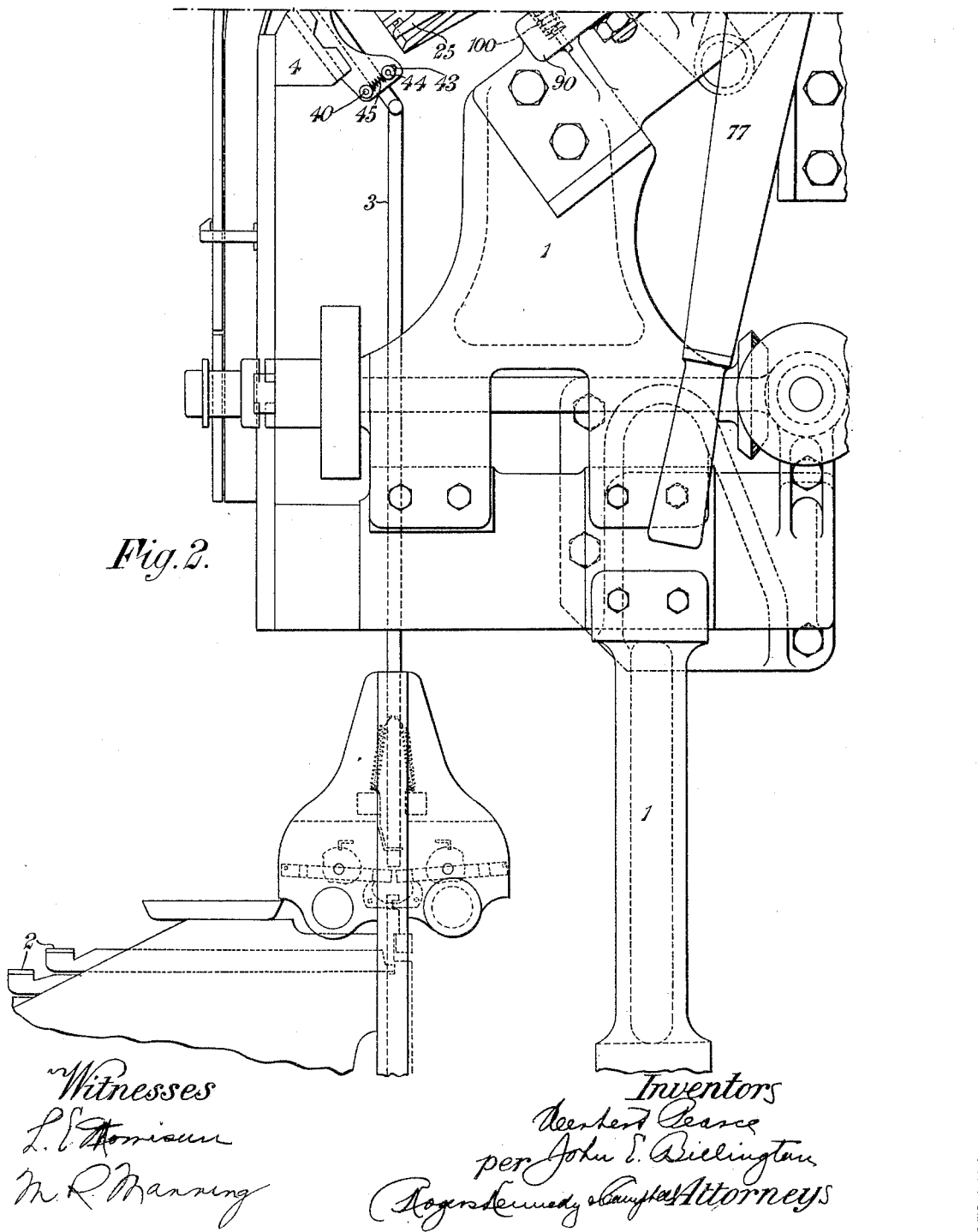

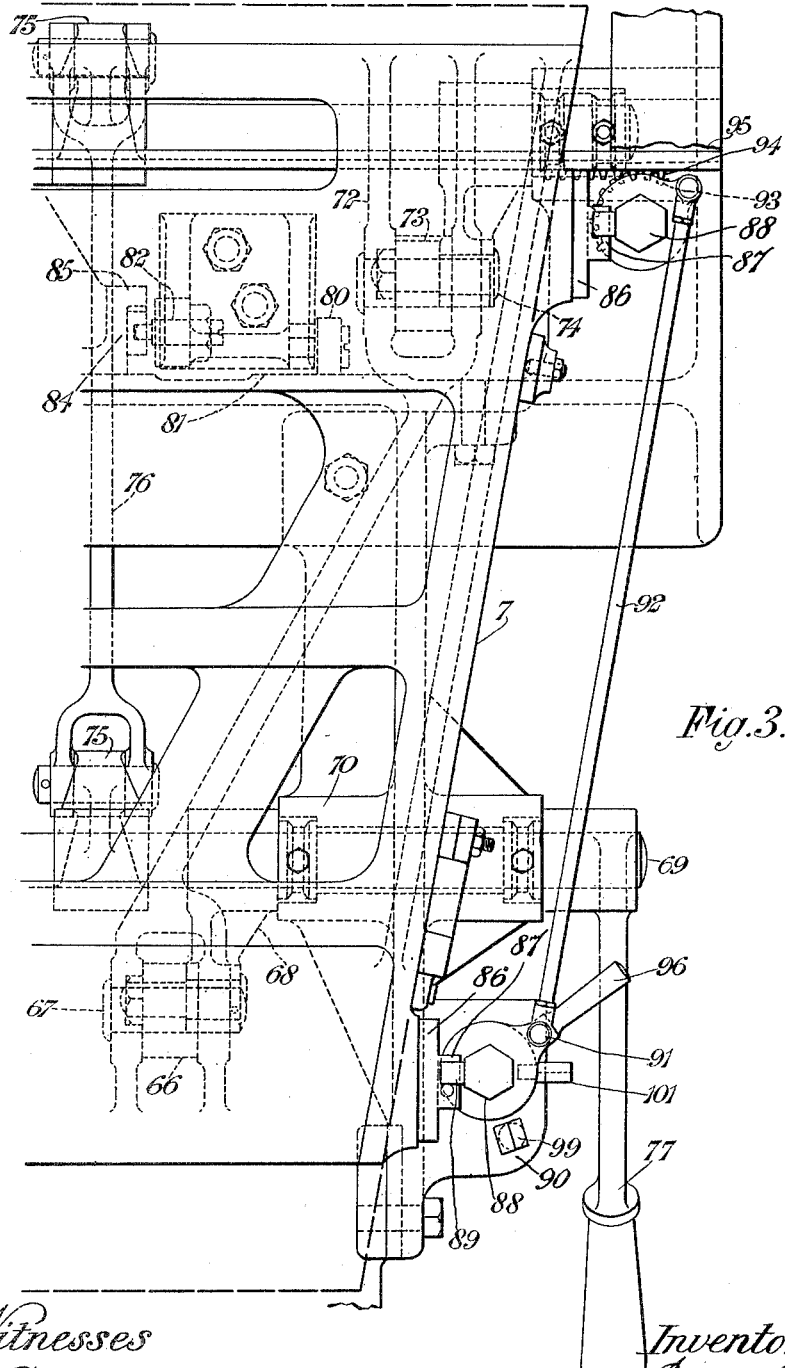

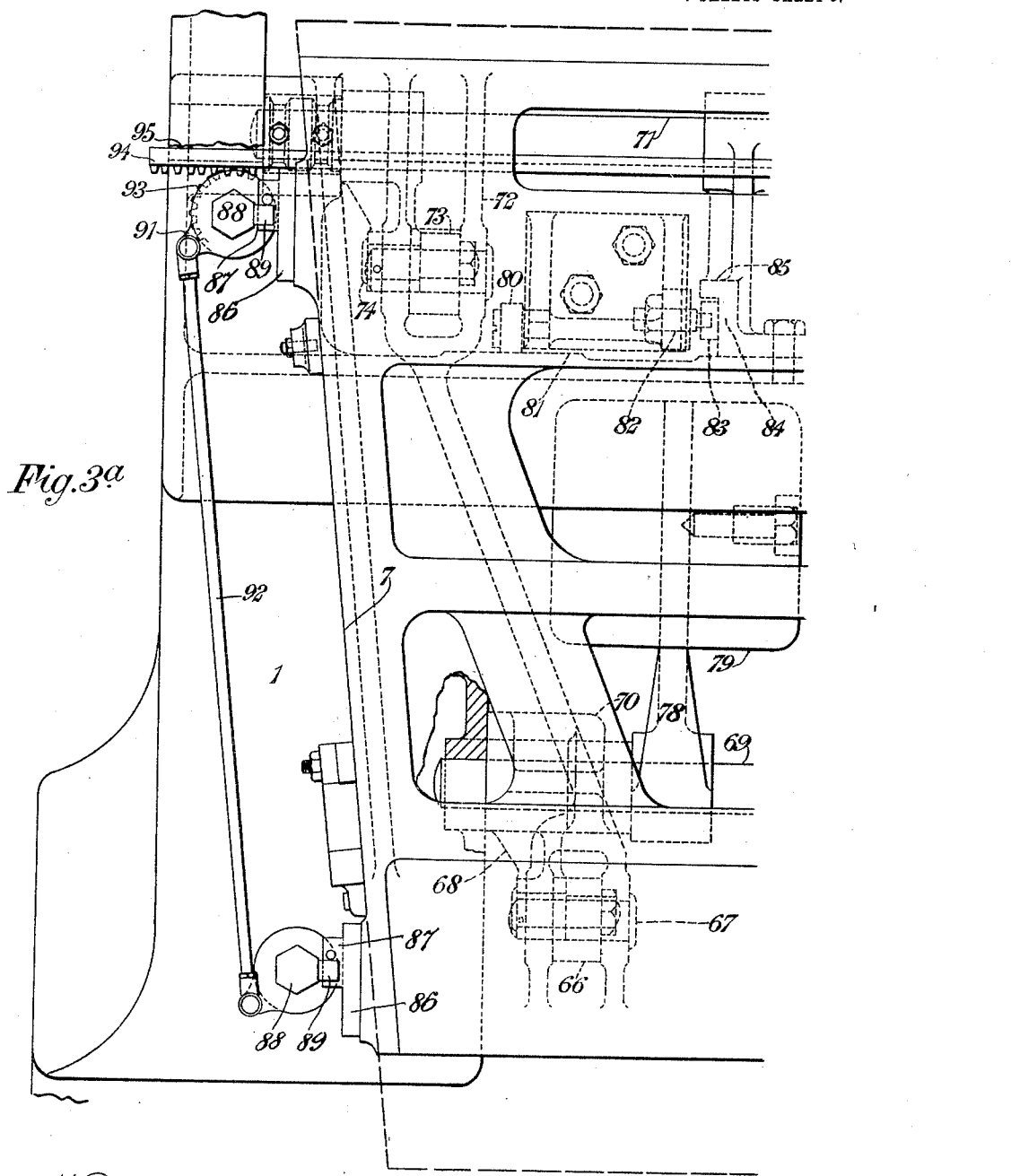

H. PEARCE & J. E. BILLINGTON.
TYPOGRAPHICAL COMPOSING MACHINE.
APPLICATION FILED MAY 29, 1911.
1,116,621.
Patented Nov. 10, 1914.
7 SHEETS—SHEET 6.
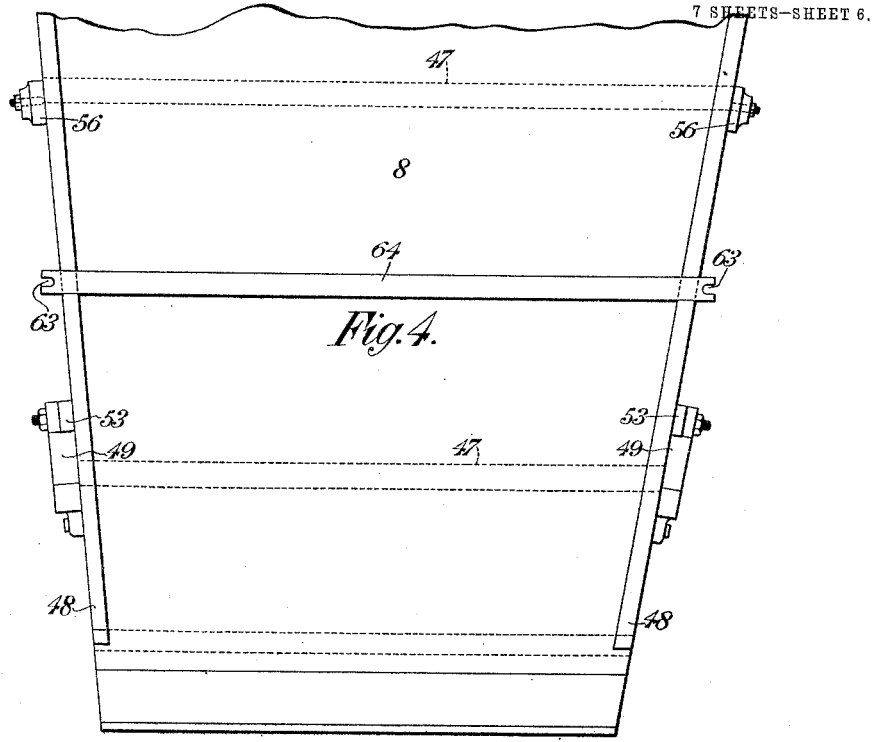
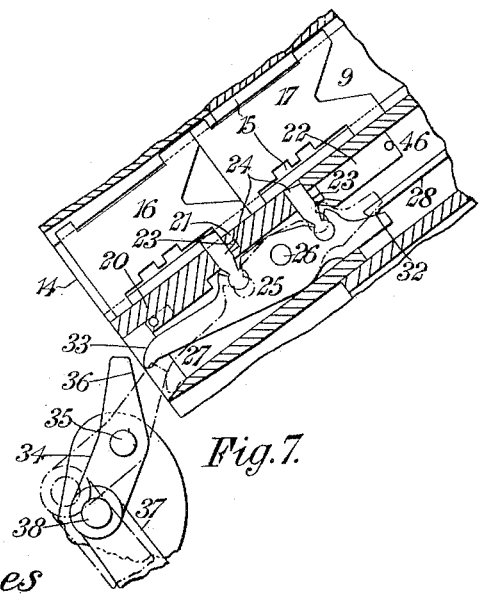
Witnesses
Inventors

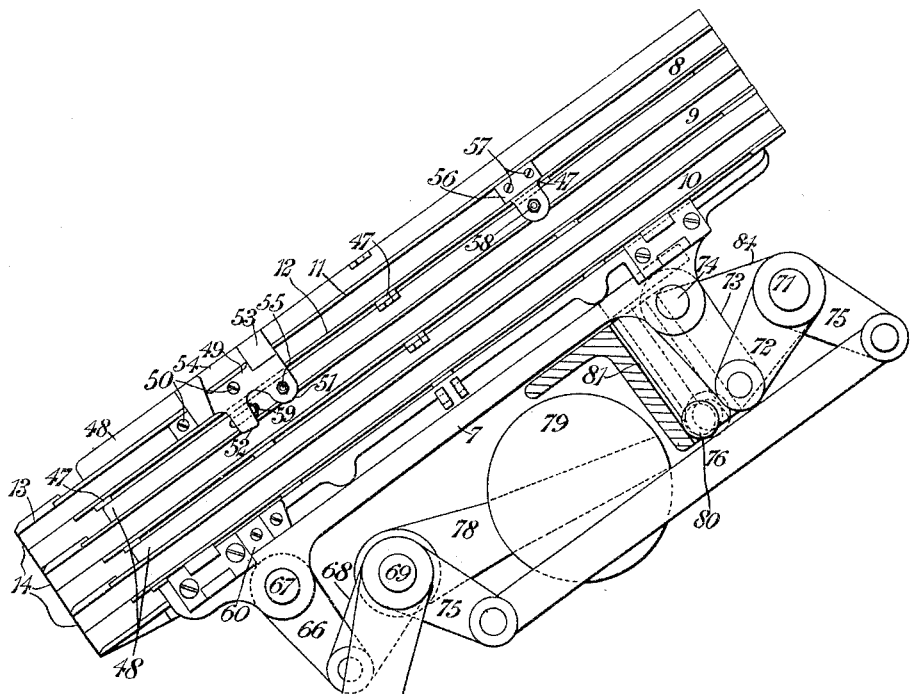
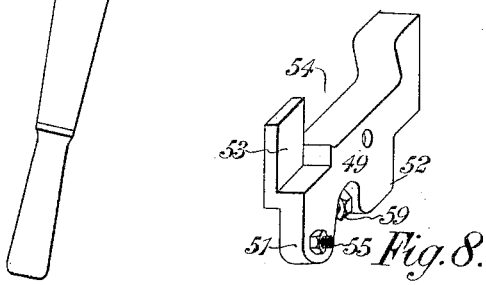
Fig. 5.
Fig. 8.

UNITED STATES PATENT OFFICE.

HERBERT PEARCE AND JOHN ERNEST BILLINGTON, OF BROADHEATH, ENGLAND, ASSIGNORS TO LINOTYPE AND MACHINERY LIMITED, OF LONDON, ENGLAND.

TYPOGRAPHICAL COMPOSING-MACHINE.

1,116,621.      Specification of Letters Patent.      Patented Nov. 10, 1914.

Application filed May 29, 1911. Serial No. 630,203.

*To all whom it may concern:*

Be it known that we, HERBERT PEARCE and JOHN ERNEST BILLINGTON, subjects of the King of the United Kingdom of Great Britain and Ireland, and residing at Linotype and Machinery Works, Broadheath, in the county of Chester, England, have invented new and useful Improvements in Typographical Composing - Machines, of which the following is a specification.

This invention relates to typographical composing machines characterized by a single keyboard, a single set of rods actuated therefrom to control the respective escapements, a single distributer, one or more (preferably oblique) magazines each adapted to hold a complete font of matrices or typedies, means for effecting a "quick change" of one magazine for another, and means for obtaining correct registration of the substituted magazine with both the magazine entrance through which the matrices pass from the distributer to the respective channels in the magazine, and the assembler entrance through which the matrices pass from the magazine to the assembling mechanism.

Referring to the accompanying drawings:—Figures 1, 1ª and 2 together constitute a side elevation of a machine known commercially under the trade mark "Linotype", to which the said improvements have been applied. Figs 3 and 3ª together constitute a plan, looking down upon Figs. 1 and 1ª at right angles with the plane of the top magazine (shown here in dash line), of the improved means for "quick changing" a column of magazines and of the improved means for securing register of a substituted magazine: Fig. 4, a plan of an improved magazine: Fig. 5, a side elevation of a column of improved magazines and the improved means for "quick changing" them: Fig. 6, a side elevation of the escapement mechanism in operative connection with the middle magazine of a three magazine column: Fig. 7, an enlarged detail side elevation of the same; and Fig 8 is an isometric view, from the rear, of a magazine registering bracket.

1 is the machine frame; 2, 2 key levers of the single key-board; 3, one of the single set of escapement rods to be raised by the depression of the respective key levers 2, to release a matrix from its magazine; 4, a transverse bar fixed across the back of 5, the single assembler entrance; 6, 6, partition plates fixed to the bar 4 and projecting rearwardly therefrom; 7, the magazine frame; 8, 9, 10, the magazines of a three-magazine column; 11, the top, and 12 the bottom, plate of a magazine; 13, a transverse bar constituting the front portion of a top plate 11; 14, the delivery mouth of a magazine; 15, a groove in the top plate 11 constituting with a like and opposite groove in the bottom plate, the channel for the respective matrices; 16, a leading, and 17, a following matrix in the said channel; 18, Fig. 1, the single magazine entrance; and 19, the single distributer.

20, 21, 22—Figs. 1ª, 6 and 7—are three transverse bars connected by any suitable devices such as slots and keys 23, jointly occupying a position opposite the transverse bar 13 and constituting the front portion of a bottom plate 12, the grooves 15 being continued through both these portions; 24, 24 are the pawls of one of the sets of escapement levers 25, the pivot rod 26 of which set is maintained in operative position by being passed through partitions 27, there being one partition fast to and depending from the lower portion of a bottom plate 12 between each two adjacent levers 25.

28 is a long wire spring having its rear end coiled around a transverse rod 29 and socketed in a transverse bar 30 fast to the bottom plate 12, in front of a transverse protecting bar 31 fast to the bar 30. These two bars may be a single T bar. The front end of each spring 28 has a convex nose 32 which bears downwardly upon the rearwardly-extending tail of the respective escapement lever 25 to maintain the illustrated and well-known engagement between the respective pawls 24 and the matrices 16 and 17. None of the devices previously mentioned in this paragraph constitutes *per se* any part of the present invention. The nose of an escapement lever 25 is held by its spring 28 flush with the plane of the magazine mouth 14.

A partition plate 6 and the respective partition 27 stand in the same plane, so that the space between two adjacent partition plates 6 registers with the space between the two opposite partitions 27.

34 is an escapement-actuating lever fulcrumed on a rod 35 passed through the top ends of all the partition plates 6, and consequently in the same vertical plane as the respective escapement lever 25, it being understood that there are as many of these levers 34 as there are escapement levers 25 on any one of the magazines. When a lever 34 is at rest, its top arm is nearly vertical and at a short distance in front of the nose of a lever 25, so that these parts will normally clear each other in order to permit the shifting of the magazines. A lever 34 is worked in both directions by the respective escapement rod 3, the connection between the two consisting of a link 37 having its upper arm joined to the bottom arm of the said lever by a pivot 38, and its bottom end to the top of the said rod by a pivot 39. Any other type of connection between a link 37 and a rod 3, which is suitable for the purpose stated, may be adopted. The lower arm of a lever 34 and the respective link 37 stand and work between two partition plates 6, one on each side of them, the said lower arm being thinned down to receive the respective link, so that both lever and link are included between the same planes.

40 is a round wire passed through round bearings in the plates 6 in a proper position for supporting an anti-friction roller 41 between each pair of plates 6, this roller having its rear edge in supporting contact with the lower front edge of the respective link 37.

42 is a similar roller similarly positioned and supported on the rear side of the said link. In addition to these similarities, there are means to prevent the locking of a lever 34 by either of the respective escapement pawls 24 becoming jammed against a matrix, interfering with the normal action of the respective rod 3. This normal action is well known and consists of a rise followed by a drop, a rise rocking an escapement lever 25 to let a matrix 16 drop through the mouth 14, and a drop allowing the said lever to be rocked back by its spring 28 to let a matrix 17 take the place of its predecessor. The said means consist—Fig. 6—of a slot 43 instead of a round bearing, to receive the wire 44 which supports the rollers 42, and so shaped that if a rod 3 is required to rise when the respective lever 34 is locked in the way described, the respective link 37 can yield and move the wire 44 in the slot 43; and a spring 45 outside each end plate 6 and pulling on the wire 44 from the wire 40 to return the roller 42 and link 37 as the rod 3 drops. The wire 40 is, preferably, continuous from one end to the other, but the wire 44 need not be so continuous—it may be in several independent lengths, each serving a certain number of links 37 and levers 34, the tension springs 45 being replaced by springs in compression pushing the respective lengths to the front. Thus, supposing a key lever 2 to be depressed, thereby raising a rod 3 at a time when a lever 34 is locked, the respective link 37 will, as soon as it feels the thrust of its rod 3, swing to the rear on its pivot 38, carrying the top end of the said rod 3 and wire (or length of wire) 44 with it. The link 37 and rod 3 are returned by their respective springs.

The rods 3 and links 37 are arranged to swing to the front instead of to the rear, the rollers 41 and their pivot wire 40 changing place with the rollers 42, their pivot wire (or wires) 44 and slots 43; and the springs 45 being reversed.

The above described means equally serve for the same purpose in the event of a key lever 2 being depressed when no magazine is in correct register with the magazine entrance 18 and assembler entrance 5, at which time a lever 34 might be prevented rocking normally to the rear.

Between two adjacent magazines 8 and 9, 9 and 10, there is a space 46 occupied partly by the escapement levers 25 and their springs 28 belonging to the magazine above, and transverse strengthening bars 47—Fig. 5—fast to the under face of the bottom plate 12 of that magazine, and supported by a bar 48 fast on the top plate 11 of the magazine next below it, close to each side edge thereof, standing up some distance above it and thick enough to constitute with its fellow bar, a surface down which the magazine immediately above and normally resting upon it, can slide easily when it has to be taken off, or up which the substitute magazine can likewise slide.

Correct transverse and fore and aft register between one magazine and the next one, and between the lowest magazine 10 and the magazine frame 7, is obtained by brackets and adjusting screws on the magazine to be put in register.

Referring to Figs. 1ª, 4, 5 and 8, 49 is a bracket held by suitable means such as screws 50 to each side of a magazine, say, an upper one. It has two lugs 51, 52, which enter respective recesses 53, 54 in the bracket 49 below it.

55 is a set screw working through a lug 51 and bearing against the opposite vertical face of the recess 53 in the bracket 49 on the magazine next below, for transverse adjustment of the upper magazine with reference thereto; or, in the case of the bottom magazine, the set screw 55 thereof is adapted to bear against the side of the magazine frame 7.

56 is a second bracket held by suitable means such as screws 57 to each side of an upper magazine, and depending from it far enough to carry a set screw 58 likewise working through it for transverse adjustment of the same magazine with reference to the one next below it by bearing against the respective bar 48 on the latter; or, in the case of the bottom magazine, with reference to the magazine frame 7 by bearing against the side thereof; 59 is a set screw working fore and aft through a lug 52 and bearing against the bracket 49 on the magazine next below it. In the case of any magazine, the four brackets 49, 49, 56, 56, are symmetrically arranged thereon, preferably in the respective positions shown. The set screws 59 for registering a bottom magazine 10 engage behind lugs 60 on the magazine frame 7. Each magazine is an exact replica of the other or others, in order that it may lie either on the magazine frame 7 or on any of the magazines.

The top of the magazine frame is flat to the extent of being without grooves, and the lowest magazine as 10 engages with it by its strengthening bars 47 which rest upon the said frame 7, this magazine being registerable thereon in the same way as one magazine is registerable upon and with respect to another, and by like means.

The magazine frame 7 has pivoted to it— Fig. 1—at 61 on each side of it, a bolt 62 adapted to engage—Fig. 4—in the forked end 63 of a transverse bar 64 extending across the top of each magazine and recessed in the bars 48 so as to be flush with their tops. The upper end of a bolt 62 is screw-threaded and fitted with a wing-nut 65—Fig. 1ª— by which all the magazines can be pinched down upon the magazine frame 7; the devices described in this paragraph, however, constitute no part of the present invention.

66—Figs. 3, 3ª and 5—are downwardly-depending links pivoted on a transverse pivot 67 one at or near each front corner of the magazine frame 7. Each link 66, at its bottom end, is pivotally connected to the adjacent outer end of an arm 68 fast on, or near each end of, a transverse shaft 69 turning in stationary bearings 70 in the machine frame 1 near the front of the machine.

71 is a second, and similarly mounted, shaft near the rear of the machine, parallel with the shaft 69 and like it, having an arm 72 fast on each end of it, the outer end of each arm pivotally connected to the bottom end of a link 73 downwardly depending from the magazine frame 7 at or near each rear corner thereof and pivoted thereon on a transverse pivot 74. The arms 68 and 72 project to the front from their respective shafts at the same angle.

75 is an arm fast on the middle of each shaft 69 and 71 and projecting to the rear at the same angle; 76 a link connecting their outer ends; and 77 a hand lever fast on the right hand end of the shaft 69, the arrangement being such that raising or lowering the hand lever 77 moves the four corners of the magazine frame 7 up or down through the same distances.

78 is an arm fast on the shaft 69, projecting from it to the rear and carrying on its rear end a weight 79 which is nearly equal to the combined weight of the magazine frame 7 and of all the magazines on it including their contents. A spring acting on the rear end of the arm 78 may replace the weight 79.

The magazine frame is fitted with rollers 80 adapted to bear against and travel over tracks 81 perpendicular to its own plane and fixed to the main frame 1, and also with lateral adjusting screws 82 with loose circular pads 83 on their ends, adapted to bear against either side of a fixed central guide or bracket 84.

It is the above mentioned raising or lowering of the hand lever 77 that effects a "quick change" among the magazines on the magazine frame 7, and as such magazines are so raised or lowered, the engagement of the rollers 80 with their respective tracks 81 prevents them sliding forward, thereby maintaining them in correct front to rear position. When a magazine is first placed on the magazine frame 7 and pushed rearward thereon to its final position, the said frame might be displaced to the rear. To prevent such displacement, the guide 84 carries tracks 85 behind the pads 83 and with which they engage.

The above described hand lever 77 may be replaced by the well-known combination of a segmental gear fast on the shaft 69 in the place of the said hand lever and capable of a similar angular motion, a front to rear shaft turning in bearings on the machine frame 1, presenting a hand wheel within convenient reach of the operator and carrying a worm engaging with the said segment whereby the shaft 69 may be turned in either direction to effect any desired "quick change" by turning the hand wheel accordingly.

For insuring exactness of register between any magazine on the magazine frame 7 on the one hand, and the magazine entrance 18 and the assembler entrance 5 on the other, the said frame is provided—Figs. 1, 1ª, 3 and 3ª—with a block 86 at each corner having a gap 87 in it, the two gaps on a side being in planes parallel with each other—Figs. 3, 3ª, and in a plane parallel with the said frame 7—Figs. 1, 1ª. Opposite each gap 87, that is, immediately on the right-hand side of the gaps on the right-hand side of the machine, and the like as to the left-hand side, there is an upstanding turret 88 capable of being turned about its axis and carrying as many studs 89 as there are magazines on the magazine frame 7. These studs project from the magazine side of a turret, are one above another, are all of the same size, are separated from each other by the same distance, center to center, as the said magazines are, and each one is capable of engaging in and with the respective gap 87 with a registering effect on the magazine frame 7 and the said magazines. Each turret 88 is pivoted in a suitable bearing in or on the machine frame, e. g., in a bracket 90 fast thereto. The four turrets are operatively connected together by any suitable means such as links or toothed racks and pinions, or by a combination of both, in such a way that angular motion imparted to one of them, shall be communicated to all the others, equally. The connecting means illustrated consists of a lug 91 projecting radially from the outside of each turret to the right or left according to which side of the machine the respective turret is on, a link 92 along each side of the machine connecting the two lugs 91 on that side; a gear 93 fast on each of the two rear turrets; and a rack bar 94 in gear with both gears 93; and a guide 95 for the said bar. The angular motion above mentioned is given to the set of turrets 88 by pulling on a handle 96 projecting from the front right-hand turret and therefore within easy reach of the operator. The turrets 88 are normally held with the registering set of studs 89 in the gaps 87, by a torsion spring 97—Fig. 1ª—acting between the lower right-hand turret and the respective bracket 90, by having its ends made fast to those parts respectively. It is to be understood that the action of the spring 97 is in a direction opposite to that in which the operator pulls the handle 96 to disengage the studs 89 from the magazine frame 7. A spring detent is preferably provided for temporarily retaining the turrets 88 in their disengaged position. The one illustrated consists of a pin 98 standing in a socket in the lower right-hand bracket 90 and having a head 99 of an angular shape; and a spring 100—Fig. 2—in the socket, holding the beveled side of the said head in the path of a rod 101 projecting radially from the respective turret and having a V-shaped under-side, the angle of which is alined with the said rod.

The particular means describes constitute our preferred form, but obviously many changes and variations may be made therein without departing from the scope of our invention.

When a "quick change" has to be made, the operator disengages the turrets 88 from the magazine frame 7 or from the respective magazine, turning them far enough for the detent 99 to lock them in their disengaged position. He then turns the shaft 69 far enough in the proper direction to place the substitute magazine in register with the magazine entrance 18 and the assembler entrance 5, and then turns the turrets 88 back until the gaps 87 and the respective set of studs 89 are mutually engaged.

Having described our invention, we declare that what we claim and desire to secure by Letters Patent is:—

1. In a typographical composing machine of the class stated, the combination of a plurality of magazines arranged one above another on a magazine frame; the said magazine frame; means for effecting correct transverse register between one magazine and the next one and between the bottom magazine and the magazine frame, consisting of a bracket held to each side of an upper magazine having lugs entering recesses in the similar bracket on the member (magazine or magazine frame as the case may be) next below it; a set screw working through one of the said lugs and bearing against the opposite vertical face of one of the said recesses; and a set screw working, for correct fore and aft register, through the other of the said lugs and bearing against the similar bracket on the member next below it.

2. In a typographical composing machine of the class stated, the combination of a plurality of magazines arranged one above another on a magazine frame; the said magazine frame; an upstanding turret at each corner of the column of magazines turning in the machine frame; interlocking devices on the magazine frame and turret, there being as many of these devices as there are magazines, a spring adapted to keep each turret in engaging position; manual means adapted to impart angular motion to one turret; and a linkage connecting the turrets in series whereby the angular motion of one turret must be shared by all the others.

3. In a typographical composing machine of the class stated, the combination of a fixed frame, and a plurality of magazines arranged one above another on a magazine frame; the said magazine frame; manual means adapted to effect a "quick change" by raising or lowering the magazine frame relatively to the fixed frame; rollers and pads on the magazine frame the rollers capable of bearing against and traveling over stationary tracks to secure the magazine frame against forward movement, and the pads capable of engaging with guides and stationary tracks to secure the magazine frame against rearward and lateral movement respectively; and the said stationary tracks and guides.

4. In a typographical machine, the combination of a plurality of magazines and a movable supporting frame therefor, with adjusting means to shift the magazines in a fore and aft direction with reference to each other or to the supporting frame so as to locate them in proper position.

5. In a typographical machine, the combination of a plurality of magazines and a movable supporting frame therefor, with adjusting means to shift the lowermost magazine laterally with reference to the supporting frame to insure its proper position thereon.

6. In a typographical composing machine, the combination of a plurality of magazines and shifting means for bringing any selected one thereof into operative position, with registering and locking means therefor, the said registering and locking means being rotatably mounted so as to be capable of a turning movement about their longitudinal axis into and out of operative position at will.

7. In a typographical machine, the combination of a movable frame to carry a plurality of magazines, and a rotatable device mounted to turn about its longitudinal axis and provided with a plurality of radial locking studs, one or another of which engages the frame according to its position.

8. In a typographical machine, the combination of the frame work, a movable column of magazines mounted therein, and a device carried by one of said parts and provided with a plurality of radial locking studs to engage in a recess formed in the other part, the said device being rotatable about its longitudinal axis to effect such engagement.

9. In a typographical machine, the combination of a movable column of magazines, and a rotatable device mounted in the machine frame to turn about its longitudinal axis, the said parts being formed so as to interlock with each other at different points to correspond to the position of the magazines.

10. In a typographical machine, the combination of a movable frame to carry a plurality of magazines and provided with a recessed block, and an upstanding turret mounted in the machine frame and provided with a plurality of radial locking studs, the said turret being rotatable at will about its longitudinal axis to effect the engagement or disengagement of one or another of its locking studs with the said recessed block.

11. In a typographical machine, the combination of a magazine, and a bracket attached directly thereto and provided with an adjusting device to shift the magazine in a fore and aft direction so as to locate it in proper position.

12. In a typographical machine, the combination of a magazine, and a bracket directly attached thereto and provided with adjusting devices to shift the magazine both in a lateral and in a fore and aft direction, so as to locate it in proper position.

13. In a typographical machine, the combination of a plurality of superposed magazines, and adjusting devices movable relatively to the magazines to shift them longitudinally with reference to each other so as to locate them in proper position.

14. In a typographical machine, the combination of a plurality of magazines and brackets attached thereto, and provided with relatively movable adjusting devices to shift the magazines with respect to each other, the said brackets being formed so as to be nested one within another.

15. In a typographical machine, the combination of a plurality of magazines and brackets attached thereto and provided with relatively movable set screws to shift the magazines with respect to each other, the said brackets being recessed so that one may receive the set screws carried by the adjacent bracket.

16. In a typographical machine, the combination of a column of magazines movable vertically in an inclined path, and means for guiding the magazines in their vertical movement and for preventing their slipping forwardly, the said means comprising a fixed track on the framework of the machine, and rollers carried by the magazines and traveling upon said track.

17. In a typographical machine, the combination of a column of magazines movable vertically in an inclined path, and means for guiding the magazines in their vertical movement and for preventing their slipping forwardly, the said means comprising a fixed track and roller at each side of the column, one of said parts being mounted on the framework of the machine, and the other connected to the movable column.

In witness whereof we have hereunto set our hands in the presence of two witnesses.

HERBERT PEARCE.
JOHN ERNEST BILLINGTON.

Witnesses:
JOHN WILLIAM THORNE,
GEORGE WEAVER.

---

Copies of this patent may be obtained for five cents each, by addressing the "Commissioner of Patents, Washington, D. C."